UNITED STATES PATENT OFFICE.

GERHARD NICOLAAS VIS, OF SCHWEIZERHALLE, SWITZERLAND.

PROCESS OF TREATING BRINE.

SPECIFICATION forming part of Letters Patent No. 698,341, dated April 22, 1902.

Application filed February 15, 1901. Serial No. 47,513. (No specimens.)

*To all whom it may concern:*

Be it known that I, GERHARD NICOLAAS VIS, doctor of philosophy and chemist, residing at the town of Schweizerhalle, near the city of Basle, Switzerland, have invented a new and useful Improvement in Processes of Treating Brine; and I do hereby declare that the following is a full, clear, and exact description of the invention, which will enable others skilled in the art to which it appertains to make and use the same.

The present invention relates to the treatment of brine and is an improvement upon the process described and claimed in my Letters Patent No. 675,686, dated June 4, 1901, adapted to obtain chlorid of sodium free from gypsum and comprises a process which depends, essentially, on the employment of carbonate of ammonia for precipitating the sulfate of calcium (gypsum) contained in soluiton in the brine, whereby the ammonium sulfate formed remains in the mother-liquor, which is used again for purifying a fresh quantity of brine. Before treating with carbonate of ammonia the brine is freed from its contents of other sulfates, magnesium salts, and calcium salts by adding sulfate of sodium and quicklime. In employing these it must be remembered that if the brine contains in addition to gypsum also other sulfates—such as sulfate of sodium, sulfate of potassium, &c.—these exclude the presence of calcium compounds, such as chlorid, bromid, or iodid of calcium, and vice versa. Having regard to these conditions, brine can be purified in the following manner almost without cost, and in so doing by-products having commercial value may be obtained. It must in the first place be ascertained whether the brine contains other sulfates or calcium or magnesium compounds besides gypsum. Of these the easily-soluble calcium and magnesium salts (if they are not present as sulfates) are converted by adding an equivalent quantity of sulfate of sodium to form chlorid of sodium and sulfate of magnesium or calcium, (gypsum.) The latter precipitates, because all naturally-produced brine is already saturated with gypsum. Then if the brine contains magnesium in the form of sulfate and halogen salts a quantity of slaked lime is added corresponding to the percentage of magnesium found, whereby said magnesium salts are converted into insoluble magnesium hydroxid, which precipitates with formation of calcium sulfate, (gypsum,) which also precipitates. The order in which these two reactions are caused to take place is of secondary importance. They can also take place simultaneously. To the brine thus freed from the magnesium salts and the calcium halogen salts, and being consequently only saturated with gypsum, is now added a quantity of carbonate of ammonia which corresponds with the percentage of calcium still contained in the brine in the form of gypsum, whereby all of said calcium is caused to precipitate as carbonate of calcium, while the ammonia remains in solution in the brine as ammonium sulfate. The brine is now separated from the precipitate, as by filtering, and evaporated until about eighty-five per cent. of the original volume is evaporated and a corresponding amount of salt—*i. e.*, chlorid of sodium—is precipitated. The salt is separated from the mother-lye by means of a centrifugal apparatus and washed with water, the washings being added to the mother-lye. All the ammonia sulfate formed in the brine from the ammonia carbonate is found in the mother-liquor, which, representing about fifteen per cent. of the original quantity of brine, is utilized for treating fresh brine, to which is added as much slaked lime as corresponds to the percentage of magnesium salts, bicarbonate of calcium, salts of heavy metals, and free carbonic acid present in the brine, plus an amount of lime corresponding to the percentage of ammonia sulfate contained in the mother-lye added. Of course it is also treated, as aforesaid, with the necessary quantity of sulfate of sodium, if there are halogen calcium salts in the brine besides gypsum or if such halogen salts are caused to form by the action of the lime. After stirring for several hours the brine contains common salt, gypsum, and free ammonia, the latter in quantity corresponding to the amount of gypsum. The brine is filtered and mixed with carbonic acid (preferably purified furnace-gases) until a sample shows no deposit of carbonate of lime either on passing carbonic-acid gas through it or on boiling. The brine is then perfectly free from gypsum and is evaporated after separation from the precipitate, the mother-lye being subsequently utilized again, as described above. In this manner it is possible by means of a single supply of ammonia and continual supplies of lime to purify unlimited quantities of brine from gypsum and magnesium salts. Of course instead of the original supply of carbonate of ammonia another ammonia salt can be used—for instance, ammonia sulfate $(NH_4)_2SO_4$—and this may be converted by means of slaked lime and carbonic acid into carbonate of ammonia, which then acts as described.

As an example of how carrying out the invention may serve the purification of the brine as operated in the saltern of Schweizerhalle, near Basle, Switzerland, two hundred and fifty cubic meters of brine are mixed with seven hundred and seventy-two kilograms of quicklime, one hundred and thirty-five kilograms of which serve for the elimination of magnesium sulfate, bicarbonate of calcium, and free carbonic acid and the remaining six hundred and thirty-seven kilograms for decomposing fifteen hundred kilograms of ammonium sulfate added together with said lime. After agitating for a few hours the charge is left to settle and the brine filtered, when purified, furnace-gases or carbonic-acid gas obtained from another source is passed into the brine, until a sample shows no deposit either on passing in more carbonic acid or on boiling. The brine is then filtered from the precipitated carbonate of lime, evaporated to about forty cubic meters, the crystallized sodium chlorid separated from the mother-lye, which contains per cubic meter about thirty-seven kilograms of ammonium sulfate resulted from the reaction between the ammonia carbonate and the gypsum of brine, and is used instead of ammonium sulfate for treating a fresh quantity of brine in the manner described.

What I claim, and desire to secure by Letters Patent of the United States, is—

1. The process of treating brine to obtain crystallized sodium chlorid free from gypsum which consists in mixing the brine with slaked lime and ammonium sulfate, passing carbonic acid in the mixture, separating the liquor from the precipitate, evaporating the liquor, separating the crystallized sodium chlorid from the mother-lye containing ammonium sulfate and reusing this mother-lye in a subsequent purification to provide the brine with ammonium sulfate, substantially as and for the purpose stated.

2. The process of treating brine to obtain crystallized sodium chlorid free from gypsum which consists in mixing the brine with slaked lime, sodium sulfate and ammonium sulfate passing carbonic acid in the mixture, separating the liquor from the precipitate, evaporating the liquor, separating the crystallized sodium chlorid from the mother-lye containing ammonium sulfate, and reusing this mother-lye in a subsequent purification to provide the brine with ammonium sulfate substantially as and for the purpose stated.

In testimony whereof I have hereunto set my hand in presence of two subscribing witnesses.

GERHARD NICOLAAS VIS.

Witnesses:
JOHN G. PLATNER,
GEO. GIFFORD.